Sept. 25, 1928.  
F. C. DE REAMER  
1,685,669  
HANGING MEANS FOR ELECTRIC FANS AND THE LIKE  
Filed May 24, 1923
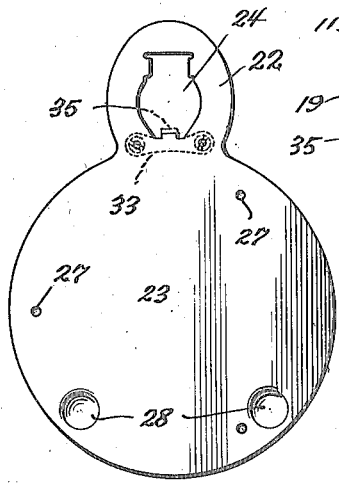
Fig.1.
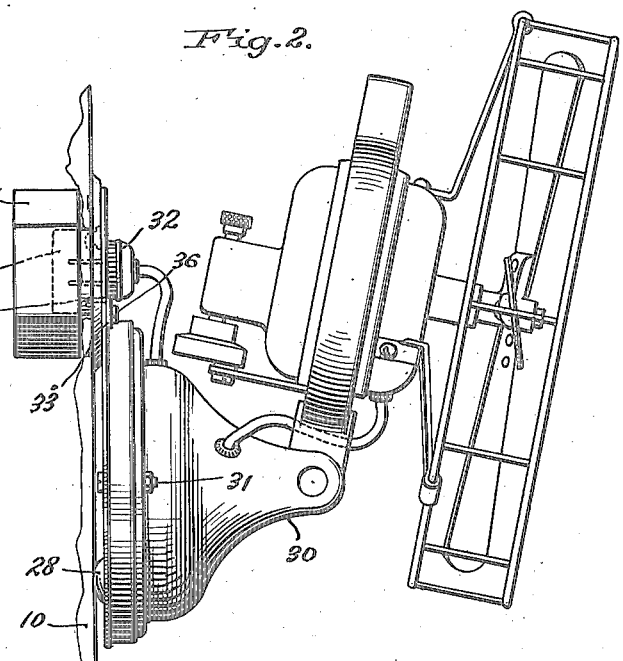
Fig.2.
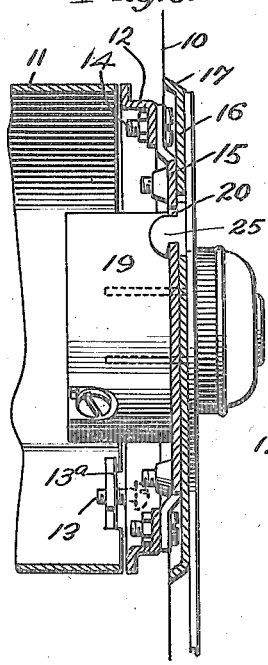
Fig.3.
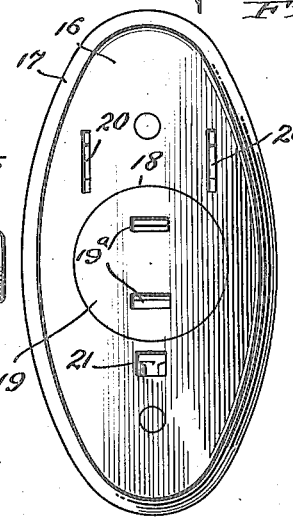
Fig.4.
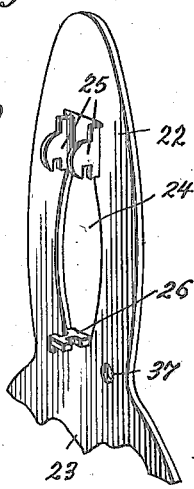
Fig.5.
Fig.6.
Inventor:  
Frank C. De Reamer,  
by Alexander &. *****  
His Attorney, Patented Sept. 25, 1928.

1,685,669

UNITED STATES PATENT OFFICE.

FRANK C. DE REAMER, OF BRIDGEPORT, CONNECTICUT, ASSIGNOR TO GENERAL ELECTRIC COMPANY, A CORPORATION OF NEW YORK.

HANGING MEANS FOR ELECTRIC FANS AND THE LIKE.

Application filed May 24, 1923. Serial No. 641,254.

There is now on the market a form of electric light wiring for buildings known as "Elexit" wherein the building is provided with wired electrical outlets in the form of plug receptacles surrounded by face plates having openings for the reception of attaching hooks. The lighting fixture which is wired as a unit, comprises an attachment plug adapted to electrically connect the fixture to the plug receptacle and a supporting part having hooks which engage the face plate slots to provide a mechanical support for the fixture. With this arrangement a lighting fixture having been wired as a unit can be hung by merely inserting the plug contacts into the receptacle openings and bringing the hooks into engagement with the slots in the face plate.

This means that there are buildings now so wired that they are provided on their walls with "Elexit" outlets and the object of my invention is to provide an arrangement whereby an electrical device such as an electric fan or the like may be hung from such an outlet.

For a consideration of what I believe to be novel and my invention, attention is directed to the accompanying description and the claims appended thereto.

In the drawing, Fig. 1 is a front view of a hanger plate; Fig. 2 is a side elevation showing the hanger plate attached to an "Elexit" outlet and an electric fan supported on it; Fig. 3 is a sectional view showing the hanger plate attached to an "Elexit" outlet; Fig. 4 is a face view of an "Elexit" outlet; Fig. 5 is a perspective view of a part of a hanger plate, and Fig. 6 is a perspective view of a locking plate.

Referring to the drawing, 10 indicates a wall in which is mounted an outlet box 11 to which is attached a ring 12 by screws 13 which extend through the ring and thread into holes in ears 13ª on the box.

Attached to ring 12 by screws 14 is a face plate 15 covered by a finishing plate 16, the latter lying substantially flush with the wall surface, being beyond it only an amount equal to the depth of flange 17. In the center of the face plate and finishing plate is a hole 18 in which is located the outer end of a plug receptacle 19, the outer surface of which lies flush with the outer surface of the finishing plate. The plug receptacle may be of any known or desired structure and may be supported in the outlet box in any suitable manner, for example, by being fastened to the cover plate. It is provided with the usual openings 19ª behind which are the plug receptacle contacts. In the face plate are two upper slots 20 and a lower T-shaped slot 21. The receptacle contacts are wired to the building circuit in the usual manner. The arrangement so far described is a side wall outlet of known type now termed an "Elexit" and in itself forms no part of my invention. It represents a type of side wall outlet with which a building may be already supplied in its various rooms.

My invention relates to an improved arrangement whereby an electrical device, such as an electric fan may be hung from an outlet of the character described. According to my invention I provide a hanger plate comprising an attaching portion 22 and a supporting portion 23 preferably formed integral with each other. Attaching portion 22 is provided with an opening 24 at the upper edge of which are two rearwardly extending hooks 25 adapted to engage the lower edge of slots 20 and at the lower edge of which is a T-shaped hook 26 adapted to engage the side edges of slot 21. The arrangement is such that when hooks 25 and 26 are inserted through slots 20 and 21 and the hanger plate then slid downwardly to bring the hooks into engagement with the edges of the slots, opening 24 will stand in line with plug receptacle 19 so that a plug connector may be passed through opening 24 into engagement with the receptacle. The supporting portion of the hanger plate is provided with holes 27 to receive fastening devices and with pressed-out bosses 28 adapted to lie against the wall and hold the hanger plate vertical when attached to the face plate.

In the present instance, I have shown an electric fan 30 fastened to the supporting portion of the hanger plate by suitable bolts 31, the attaching plug for the fan being indicated at 32.

In use the electric fan is permanently fastened to the hanger plate by screws 31 after which it is adapted for use on any room provided with an outlet of the Elexit type. To hang the fan it is only necessary to fasten the hanger plate to the outlet by passing hooks 25 and 26 through slots 20 and 21 and then sliding the hanger plate downward to effect engagement of the hooks. Preferably the opening 24 in the hanger plate is of such size and is so located with respect to the hooks that the plug cannot be inserted through it into engagement with the receptacle until the hanger plate is moved downward to effect engagement of the hooks and that when the plug is then inserted it so fits the opening that it prevents the hanger plate from being slid upward. The plug thus serves as a locking means to lock the hanger plate to the wall fixture.

In addition to or in lieu of the plug locking means I may provide a locking means as shown in perspective in Fig. 6 the same comprising a locking plate 33 having holes 34 in its ends and an inturned lug 35 adapted to fit the upper end of T-slot 21. After the fan has been hung it may be locked in place by inserting lug 35 into slot 21 above hook 26 and fastening it there by suitable screws 36 which pass through holes 34 and screw into tapped holes 37 in the hanger plate. This then prevents removal of the fan without first removing the screws and the locking plate.

In accordance with the provisions of the patent statutes, I have described the principle of operation of my invention, together with the apparatus which I now believe to represent the best embodiment thereof, but I desire to have it understood that the apparatus shown is only illustrative and that the invention may be carried out by other means.

What I claim as new and desire to secure by Letters Patent of the United States, is—

1. A hanger plate for use in attaching an electrical device to a wall outlet having a face plate and a plug receptacle, comprising an attaching portion provided with means for making mechanical connection with the face plate, said attaching portion having an opening through which the plug receptacle is exposed when said mechanical connection is made, and a supporting portion which depends from one edge of the attaching portion and is provided with means for engaging the wall below the outlet.

2. A hanger plate for use in attaching an electrical device to a wall outlet having a face plate and a plug receptacle, comprising an attaching portion provided with means integral therewith for making mechanical connection with the face plate, said attaching portion having an opening through which the plug receptacle is exposed when said mechanical connection is made, a supporting portion which projects from an edge of the attaching portion integral therewith, and means carried by and integral with the supporting portion which engage the wall below the outlet when connected therewith.

In witness whereof I have hereunto set my hand this 21st day of May, 1923.

FRANK C. DE REAMER.